(12) United States Patent
Molenberg

(10) Patent No.: US 7,282,584 B2
(45) Date of Patent: Oct. 16, 2007

(54) METHYLENE BLUE

(75) Inventor: Aaldert Molenberg, Binningen (CH)

(73) Assignee: Straumann Holding AG, Basel (CH)

( * ) Notice: Subject to any disclaimer, the term of this patent is extended or adjusted under 35 U.S.C. 154(b) by 0 days.

(21) Appl. No.: 11/521,971

(22) Filed: Sep. 15, 2006

(65) Prior Publication Data

US 2007/0066829 A1    Mar. 22, 2007

Related U.S. Application Data

(63) Continuation-in-part of application No. 11/629,567, filed as application No. PCT/EP2005/004977 on May 9, 2005.

(30) Foreign Application Priority Data

Jun. 16, 2004  (EP) ............................... 04014072.5
Sep. 16, 2005  (EP) ............................... 05020181.3

(51) Int. Cl.
C07D 279/18 (2006.01)
C07C 69/52 (2006.01)
C07C 57/02 (2006.01)

(52) U.S. Cl. .................. 544/37; 560/205; 562/598

(58) Field of Classification Search .................. None
See application file for complete search history.

(56) References Cited

U.S. PATENT DOCUMENTS

| | | | | |
|---|---|---|---|---|
| 3,989,740 | A | * 11/1976 | Broussard et al. ........ | 560/224 |
| 4,021,310 | A | 5/1977 | Shimizu et al. | |
| 4,804,891 | A | 2/1989 | Sweeney | |
| 4,894,238 | A | 1/1990 | Embrey | |
| 5,368,859 | A | 11/1994 | Dunn et al. | |
| 5,410,016 | A | 4/1995 | Hubbell | |
| 5,874,500 | A | 2/1999 | Rhee | |
| 6,051,648 | A | 4/2000 | Berg | |
| 6,258,351 | B1 | 7/2001 | Harris | |
| 6,432,397 | B1 | 8/2002 | Harris | |
| 6,558,658 | B2 | 5/2003 | Harris | |
| 7,009,034 | B2 | 3/2006 | Pathak | |

FOREIGN PATENT DOCUMENTS

| | | | |
|---|---|---|---|
| DE | 215 699 | A1 | 11/1984 |
| DE | 215699 | A1 * | 11/1984 |
| EP | 0 334 500 | A1 | 9/1989 |
| EP | 0367362 | B1 | 6/1994 |
| EP | 1080700 | A | 3/2001 |
| EP | 0705298 | B1 | 3/2002 |
| EP | 1053019 | B1 | 12/2003 |
| EP | 1411075 | A2 | 4/2004 |
| EP | 1061954 | B1 | 6/2004 |
| EP | 0876165 | B1 | 6/2006 |
| GB | 942318 | | 11/1963 |
| JP | 56084708 | | 7/1981 |
| JP | 08155024 | | 6/1996 |
| RO | 81794 | | 6/1983 |
| WO | WO92/10218 | A | 6/1992 |
| WO | WO94/03155 | A1 | 2/1994 |
| WO | WO97/22371 | A1 | 6/1997 |
| WO | WO98/12274 | A1 | 3/1998 |
| WO | WO99/14259 | A1 | 3/1999 |
| WO | WO 00/33764 | A1 | 6/2000 |
| WO | WO 00/44808 | A1 | 8/2000 |
| WO | WO 00/59559 | A1 | 10/2000 |
| WO | WO 01/16210 | A1 | 3/2001 |
| WO | WO 01/92584 | A1 | 12/2001 |
| WO | WO 02/102864 | A1 | 12/2002 |
| WO | WO 03/040235 | A1 | 5/2003 |
| WO | WO 03/080144 | A | 10/2003 |
| WO | WO 2005/018491 | A2 | 3/2005 |

OTHER PUBLICATIONS

European Search Report and Annex (Office Action) in corresponding EP 0502 0181 dated Feb. 7, 2006.
Levy, L., Inhibition of Acrylic Acid Polymerization by Phenothiazine and p-Methoxyphenol. II. Catalytic Inhibition by Phenothiazine, Journal of Polymer Science Part A: Polymer Chemistry, 1992, 569-576, vol. 30, John Wiley & Sons, Inc. U.S.A.
Mitchell, S.C., The Toxicity of Phenothiazine, Drug Metabolism and Drug Interactions, 1994, 201-235, vol. 11, No. 3, Freund Publishing House Ltd., U.K.
Schulze and Vogel, Aspects of the Safe Storage of Acrylic Monomers: Kinetics of the Oxygen Consumption, Chem. Eng. Technol., 1998, 829-837, vol. 21, No. 10, Wiley-VCH, DE.
U.S. Appl. No. 60/110,849, Pathak.
U.S. Appl. No. 60/040,417, Pathak.
U.S. Appl. No. 60/039,904, Pathak.
U.S. Appl. No. 60/026,526, Pathak.
International Search Report mailed Aug. 31, 2005 from International Application No. PCT/EP2005/004977.
Macchiarini, P. et al., "Experimental and Clinical Evaluation of a New Synthetic, Absorbably Sealant to Reduce Air Leaks in Thoracic Operations," Journal of Thoracic and Cardiovascular Surgery, Apr. 1999, 751-758, Mosby Inc.
Ranger, W. et al., "Pneumostasis of Experimental Air Leaks with a New Photopolymerized Synthetic Tissue Sealant," The American Surgeon, Sep. 1997, 788-785.
Lutzi, F.G. et al., "Tinted Hydrogel Lenses Permanancy of Tint, " Am J Optom & Physiol Optics, May 1985, 329-333, vol. 62, No. 5, American Academy of Optometry, USA.

* cited by examiner

*Primary Examiner*—Paul A. Zucker
(74) *Attorney, Agent, or Firm*—Rissman Jobse Hendricks & Oliverio, LLP

(57) ABSTRACT

Composition comprising a polymerizable compound with at least one conjugated unsaturated group and methylene blue to prevent premature polymerization of the polymerizable compound. The methylene blue is present in a concentration of 10 to 5000 ppm.

10 Claims, 5 Drawing Sheets

METHYLENE BLUE

This application is a CIP of copending U.S. application Ser. No. 11/629,567 filed Dec. 14, 2006, which is a national stage of International Application No. PCT/EP05/004977 filed May 9, 2005, and which claims priority to EP Application EP 04 014 072.5 filed Jun. 16, 2004, and this application further claims the benefit of priority to EP Application 05 020 181.3 filed Sep. 19, 2005, the disclosures of which are hereby incorporated by reference in their entirety.

FIELD OF THE INVENTION

The present invention relates to the prevention of premature polymerization during the transportation and storage of a polymerizable compound with at least one conjugated unsaturated group by addition of methylene blue as inhibitor.

BACKGROUND OF THE INVENTION

Polymerizable compounds with at least one conjugated unsaturated group are widely used as basic chemicals. Examples are acrylic monomers, in particular acrylic acid and methacrylic acid. They are mostly used for the synthesis of polymers. In recent times such polymerizable compounds have been used in medicine.

Polymerizable compounds with at least one conjugated unsaturated group are also known to be used for forming biodegradable materials. In WO 01/92584 a matrix material is disclosed which is formed by nucleophilic addition reaction to conjugated unsaturated groups.

WO 00/44808 also discloses a polymeric biomaterial formed by nucleophilic addition reaction to conjugated unsaturated groups. The obtained hydrogels may be used for example as glues or sealants and as scaffolds for tissue engineering and wound healing applications.

During the manufacture, transport and storage of these polymerizable compounds with at least one conjugated unsaturated group, the so-called "runaway" polymerization has to be avoided, since this leads not only to quality loss of the monomer but also to safety problems. Especially when used in medicine such compounds have to fulfill purity requirements, since polymerization would impede stoichiometry of the nucleophilic addition reaction and cause premature gelation of a product. The research of past decades on the inhibition of polymerization of for example acrylic monomers has produced many usable inhibitors to prevent the radical polymerization.

An example of a powerful inhibitor is a methyl ether of hydroquinone (MEHQ), which is usually present in acrylic acid at a concentration of approximately 200 ppm (S. Schulze, H. Vogel, Chem. Eng. Technol. 21, 829-836 (1998)). Said inhibitor works only in the presence of oxygen. Therefore MEHQ is not suitable for compositions which are to be used in medicine. Oxygen could impair the longterm stability of components of these compositions, e.g. peroxides could be formed in poly(ethylene glycol), and should therefore not be present in such compositions.

Another inhibitor which is industrially used to inhibit polymerization of said polymerizable compounds is phenothiazine (PTZ). In contrast to MEHQ, PTZ is also a good inhibitor in the absence of oxygen (Levy, J. Polymer Science: Part A: Polymer Chemistry, Vol 30, 569-576 (1992)). Said compound is known for its insecticidal, fungicidal, antibacterial and anthelmintic properties. Due to its widespread use in animals and man many adverse reactions are known encompassing effects on blood elements, neuromuscular problems and photosensitization (Mitchell, S. C., the toxicity of phenothiazine, Drug Metabolism and Drug Interactions, 11, 204-235 (1994)). Due to said adverse reaction phenothiazine-based inhibitors should not be used in compositions which are to be used in medicine.

Methylene blue is a well known dye. It is used as dye in medicine and is known to be biocompatible. For example U.S. Pat. No. 7,009,034 B2 discloses biocompatible crosslinked polymers which may contain visualization agents to improve their visibility during surgical procedures. A possible visualization agent is methylene blue.

Methylene blue is also used in the process for preparing methacrylic compounds. GB 942318 discloses a process for preparing methacrylamide and/or sulphuric acid derivative. The reaction may be carried out in the presence of methylene blue. U.S. Pat. No. 4,021,310 discloses a method for inhibiting the polymerization of acrylic acid or acrylic esters during the distillation for separating or purifying the acrylic acid obtained by the vapour phase catalytic oxidation of propylene or acrolein. Said method is carried out in the presence of molecular oxygen, a copper compound and a further compound which may be methylene blue.

DE 215 699 discloses a dental composition which is curable by light comprising an acrylate compound, an initiator compound as well as a dye. The dye is added to produce singlet oxygen. As possible dye methylene blue is mentioned.

By "conjugated unsaturated group" the alternation of carbon-carbon, carbon-heteroatom or heteroatom-heteroatom multiple bonds with single bonds is meant.

By "polymerizable compound" is meant that said compound can undergo a polymerization reaction.

SUMMARY OF THE INVENTION

The problem of the present invention is to provide an inhibitor to prevent the polymerization of polymerizable compounds with at least one conjugated unsaturated group, which may be used in medicine.

Surprisingly it has been found that methylene blue has the ability to prevent the polymerization of polymerizable compounds with at least one conjugated unsaturated group. In the absence of oxygen methylene blue inhibits said polymerization reaction even better than the well known inhibitor phenothiazine. Methylene blue has to be present in a concentration of 10 to 5000 ppm, preferably 20 to 1000 ppm, to inhibit the polymerization of the polymerizable compounds over a long period of time. Surprisingly it could be shown that in absence of oxygen a composition comprising 100 ppm methylene blue is significantly better stabilized than a composition comprising 10 times more phenothiazine (1000 ppm).

Due to the fact that methylene blue has the ability to function as inhibitor in the absence of oxygen, said inhibitor may be used in all fields in which the presence of oxygen is undesired. As mentioned before, for example in pharmaceutical compositions the presence of oxygen should be avoided since oxygen could impair the stability of said compositions. Such compositions are generally in an inert atmosphere such as under argon or under nitrogen. Said compositions are oxygen-free or oxygen-poor, which means that the concentration of oxygen is less than 5%, preferably less than 2%, and most preferably less than 0.5%. It has been found that the absence of oxygen does not influence the activity of methylene blue as inhibitor of the polymerization reaction.

In one embodiment, the blue colour of the composition has a positive side effect when used in medicine, since the visibility of the medicinal product is improved.

In a preferred embodiment the polymerizable compound with at least one conjugated unsaturated group is acrylic acid, methacrylic acid and esters thereof which are particularly liable to polymerize among vinyl compounds. Said compounds may be present alone or as mixtures. Examples of the acrylic ester include methyl acrylate, ethyl acrylate, butyl acrylate, 2-ethylhexyl acrylate, 2-hydroxyethyl acrylate, and 2-hydroxypropyl acrylate. Examples of the methacrylic ester include methyl methacrylate, butyl methacrylate, 2-hydroxyethyl methacrylate, and 2-hydroxypropyl methacrylate.

Polymerizable compounds which are used to form biodegradable matrix material are generally difficult to stabilize since they have to be stored under oxygen-free or oxygen-poor conditions and since the stabilizer has to be biocompatible. Said compounds are especially difficult to stabilize if they have a high number of short chains, and thus a high density of acrylates, resulting in a strong tendency to spontaneously polymerize. It has been found that said compounds which are described below are particularly well stabilized in the presence of methylene blue.

Polymerizable compounds which are used to form biodegradable matrix material comprise a core having 2 to 10 chains with a conjugated unsaturated group attached to any of the last 20 atoms of the chain. In a preferred embodiment said conjugated unsaturated group is terminal. The core can be a single atom such as a carbon or a nitrogen atom or small molecules such as an ethylene oxide unit, a sugar, a multi-functional alcohol, such as pentaerythritol or hexaglycerol. The chains are linear polymers or linear or branched alkyl chains optionally comprising heteroatoms, amide groups or ester groups. Beside the chains the core may be additionally substituted with linear or branched alkyl residues or polymers which have no conjugated unsaturated groups. In a preferred embodiment the compound has 2 to 10 chains, most preferably 4 to 8 chains.

The conjugated unsaturated group is preferably selected from the group consisting of acrylates, acrylamides, quinines, and 2- or 4-vinylpyridiniums.

In a most preferred embodiment the chains of the polymerizable compounds are linear polymers. Said polymers are preferably selected from the group consisting of poly(ethylene glycol), poly(vinyl alcohol), poly(ethylene-co-vinyl alcohol), poly(acrylic acid), poly(ethylene-co-vinyl-pyrrolidone), poly(ethyloxazoline), poly(vinyl pyrrolidone), poly(ethylene-co-vinyl pyrrolidone), poly(maleic acid), poly(ethylene-co-maleic acid), poly(acrylamide) or poly ethylene-co-poly(propylene oxide) block copolymers. Said polymers can also be copolymers, block copolymers, graft copolymers, or random copolymers. Blocks, which are polymerized on the ends of the hydrophilic polymers, can be composed of, for example, lactic acid, glycolic acid, ϵ-caprolactone, lactic-co-glycolic acid oligomers, trimethylene carbonate, anhydrides, and amino acids.

In a most preferred embodiment the chains of the polymerizable compounds are poly(ethylene glycol) molecules (PEG).

It has been found that methylene blue stabilizes particularly well an eight-arm branched PEG acrylate from hexaglycerol as shown below:

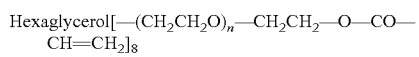

wherein n is 2 to 200, preferably 3 to 10.

To obtain the stabilized composition according to one embodiment of the present invention the following procedure is preferred. Immediately after purification of the compound with at least one conjugated unsaturated group and before evaporation of the solvent, methylene blue is added to said compound. After mixing the components the solvent is evaporated which results in the stabilized composition according to the present invention.

The composition according to one embodiment of the present invention may additionally comprise ethanol which increases the solubility of methylene blue in the compound with at least one conjugated unsaturated group. To obtain such a composition ethanol is added after evaporation of the solvent.

The composition of the present invention may be used in different fields. Especially preferred are fields in which the absence of oxygen and biocompatibility are important. Preferably the composition according to the present invention is used in medicine, in particular in dentistry.

DETAILED DESCRIPTION

Example 1

Samples of 8-arm PEG-acrylate 2 k with different inhibitors (methylene blue MB, phenothiazine PTZ, and a methyl ether of hydroquinone MEHQ) were weighed into DSC pans and were heated until they had polymerized. Analysis was performed according to the ASTM698 method:

for each sample differential scanning calorimetry DSC traces (energy released vs. temperature) were recorded at different heating rates (β=4, 7, 10, and 13 K/min). The temperatures $T_{max}$ at which the polymerization peaks showed a maximum were recorded and the activation energy for the polymerization ($E_a$) was determined from eq. 1:

$$\ln\frac{\beta}{T_{max}^2} = const - \frac{E_a}{RT_{max}} \tag{1}$$

where R is the gas constant (8.314 J/(mol*K)).

Figure 1:
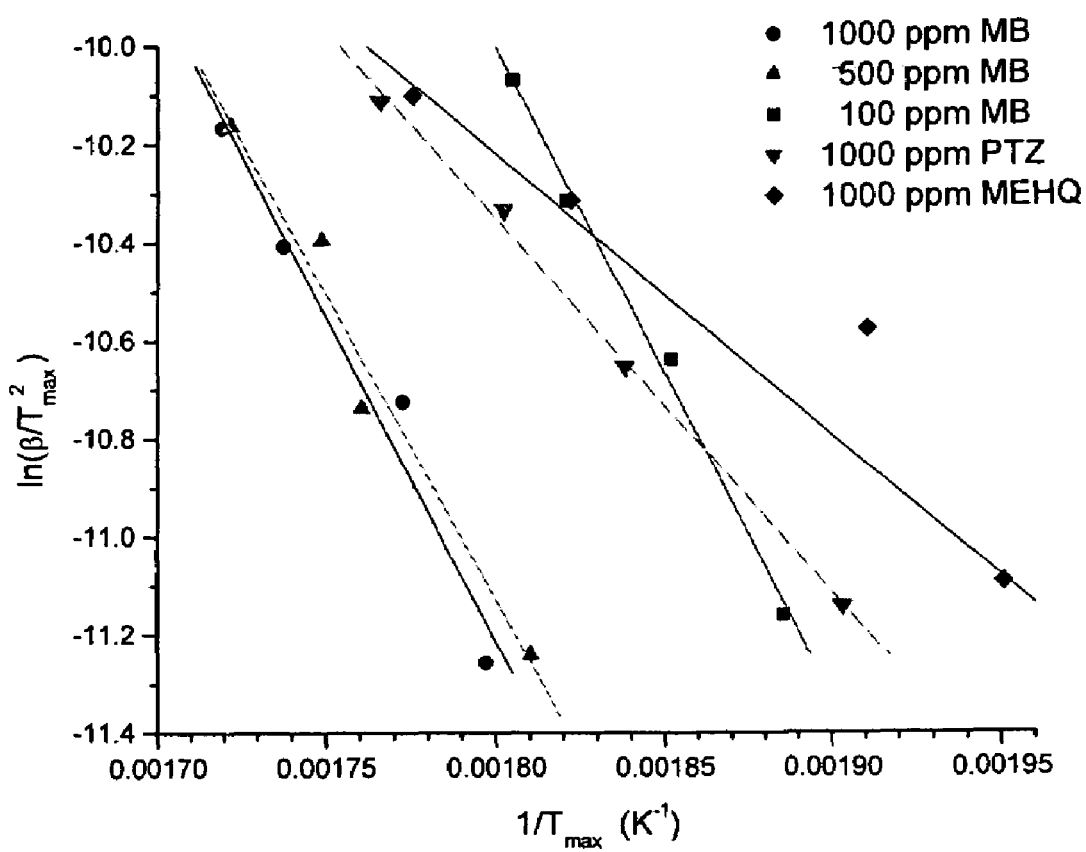
FIG. 1 is a graph of DSC data obtained for various samples of 8-arm PEG-acrylate compounds with different inhibitors.

FIG. 1 shows the data for 5 different samples.

The preexponential factor A was determined by eq. (2):

$$A = \frac{E_a}{RT_{max}^2} \beta \exp\left(\frac{E_a}{RT_{max}}\right) \quad (2)$$

The values of A were averaged over the four heating rates. The values of $E_a$ and average values of A are shown in table 1.

TABLE 1

|  | $E_a$ (kJ/mol) | A (min$^{-1}$) |
| --- | --- | --- |
| 1000 ppm MB | 110 | $4.4 \cdot 10^9$ |
| 500 ppm MB | 110 | $1.3 \cdot 10^{10}$ |
| 100 ppm MB | 104 | $1.0 \cdot 10^9$ |
| 1000 ppm PTZ | 63 | $2.2 \cdot 10^5$ |
| 1000 ppm MEHQ | 48 | $6.4 \cdot 10^3$ |

By assuming the first order kinetics, ASTM698 permits evaluating the time ($t_\alpha$) to reach a certain extent of reaction ($\alpha$) as follows:

$$t_\alpha = \frac{-\ln(1-\alpha)}{A\exp\left(\frac{-E_a}{RT}\right)} \quad (3)$$

Using the experimentally evaluated values of $E_a$ and A, for each of the samples times to reach 1% of conversion ($\alpha$=0.01 in eq. 3) at different temperatures T were estimated. The results are shown in FIG. 2.

Figure 2:
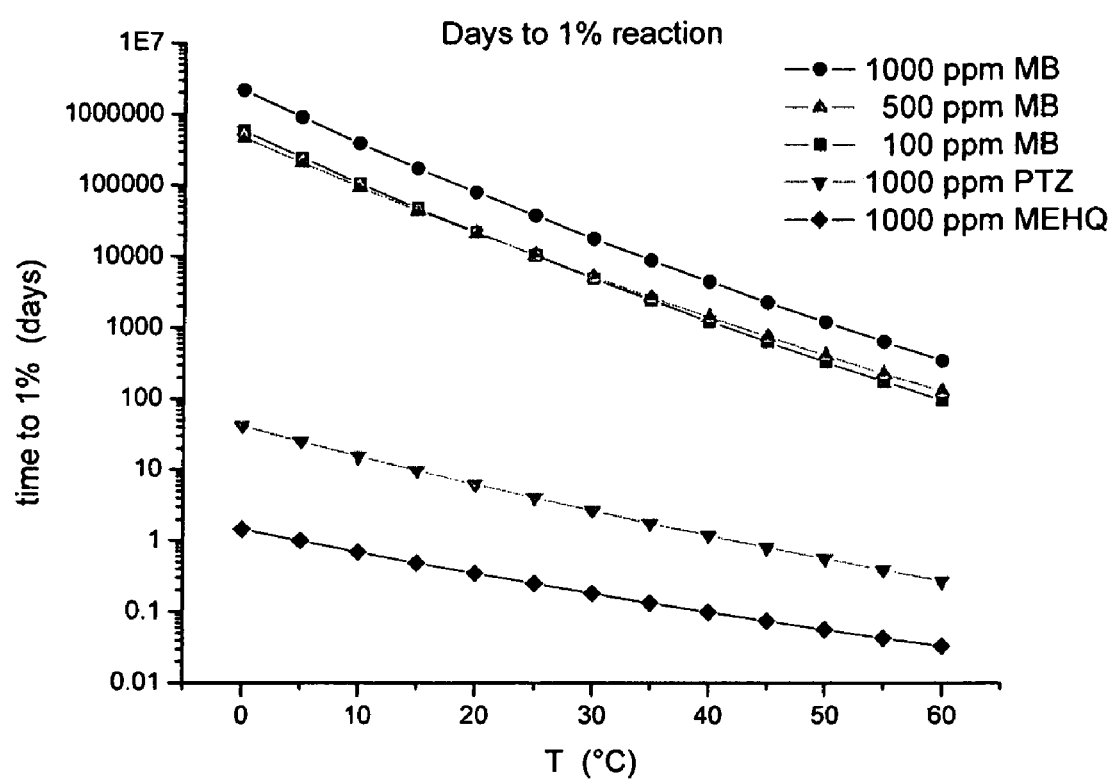
FIG. 2 is a graph of estimated time to reach 1% conversion at different temperatures, for each of the samples analyzed in FIG. 1, showing the superiority of the stabilized methylene blue composition according to one embodiment of the present invention.

FIG. 2 clearly shows the superior stability of the methylene blue stabilized samples compared to the PTZ and MEHQ stabilized samples.

Example 2

In order to establish a relationship between methylene blue (MB) concentration and stability of 8-arm Peg-acrylate 2 k, a stress test has been performed.

Samples of one freshly synthesized 8-arm PEG-acrylate 2 k batch (Nektar Therapeutics, 490 Discovery Drive, Huntsville, Ala. 35806, USA, batch# CM030703) were spiked with different concentrations of MB (250, 500, 1000, and 2000 ppm). For each MB concentration two 3 gram samples were added into separate 20 ml test tubes, which were closed with covers with argon inlets. The tubes were kept at 70° C. under argon and the samples were checked daily until they had polymerized, as observed by solidification of the PEG oil.

Figure 3:
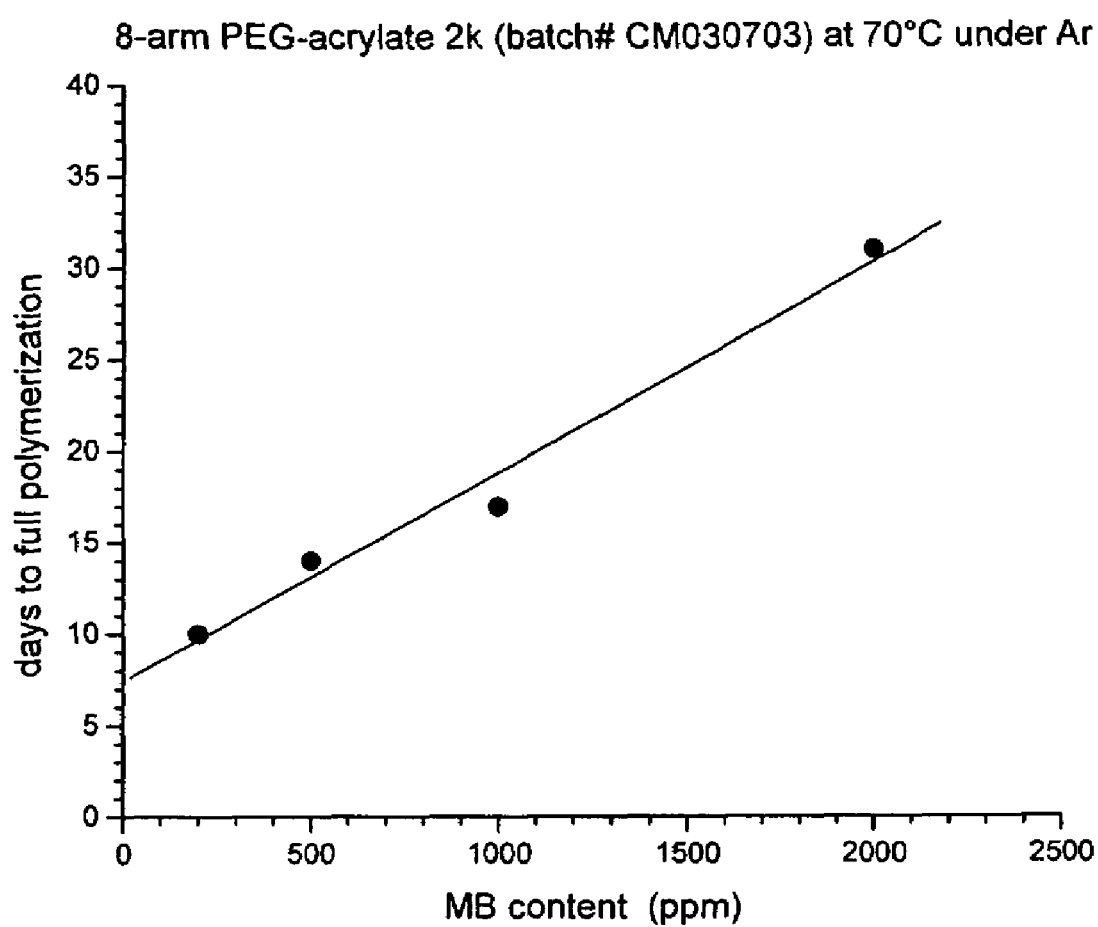
FIG. 3 is a graph showing the relationship between methylene blue content and stability.

FIG. 3 shows the results of the experiment. The linear relationship between MB content and stability confirms that the stabilizing effect is exerted by methylene blue.

Example 3

Figure 4:
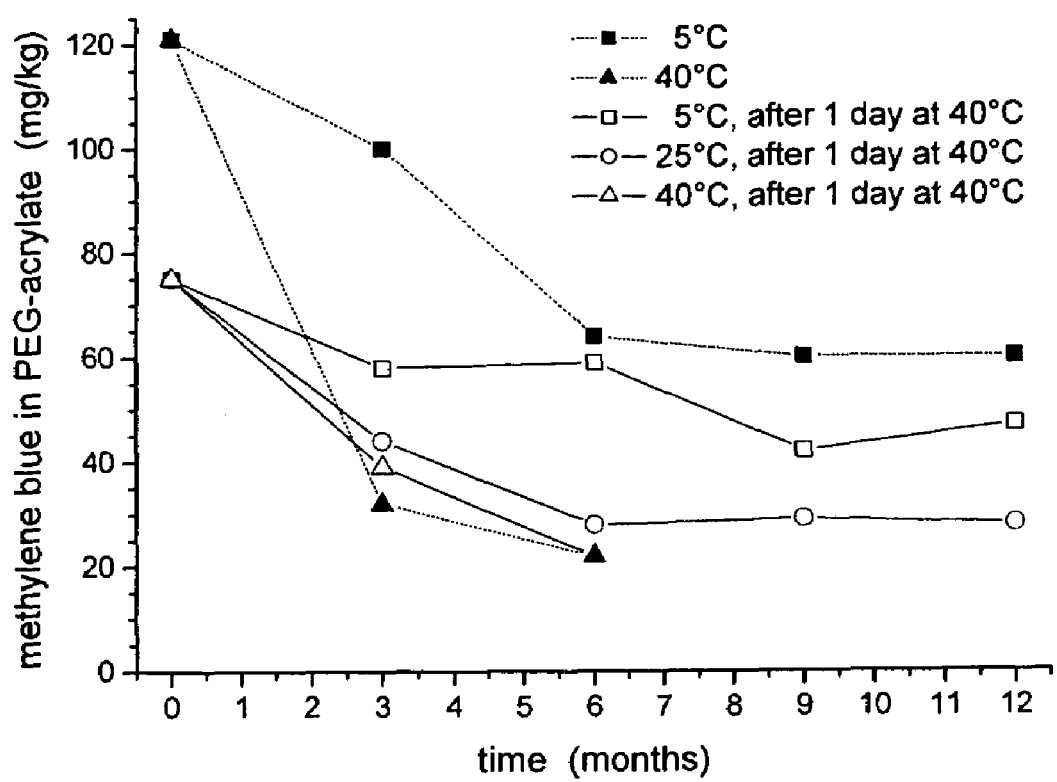
FIG. 4 is a graph showing the effect of storage temperature on stability and the consumption of the methylene blue.

The content of methylene blue in 8-arm PEG-acrylate 2 k was monitored in time under different simulated storage conditions for samples that were taken from the freezer and for samples that had been prestressed at 40° C. for 1 day (FIG. 4). For all conditions the methylene blue content decreased in time, indicating that methylene blue was consumed while exerting its stabilizing function. After 6 months, methylene blue concentrations reached approximately constant values, which were higher for lower temperatures. The prestressed samples showed a clearly lowered methylene blue content at the start of the measurements, but levels of prestressed and non-prestressed samples became similar after some time at 40° C.

Figure 5:
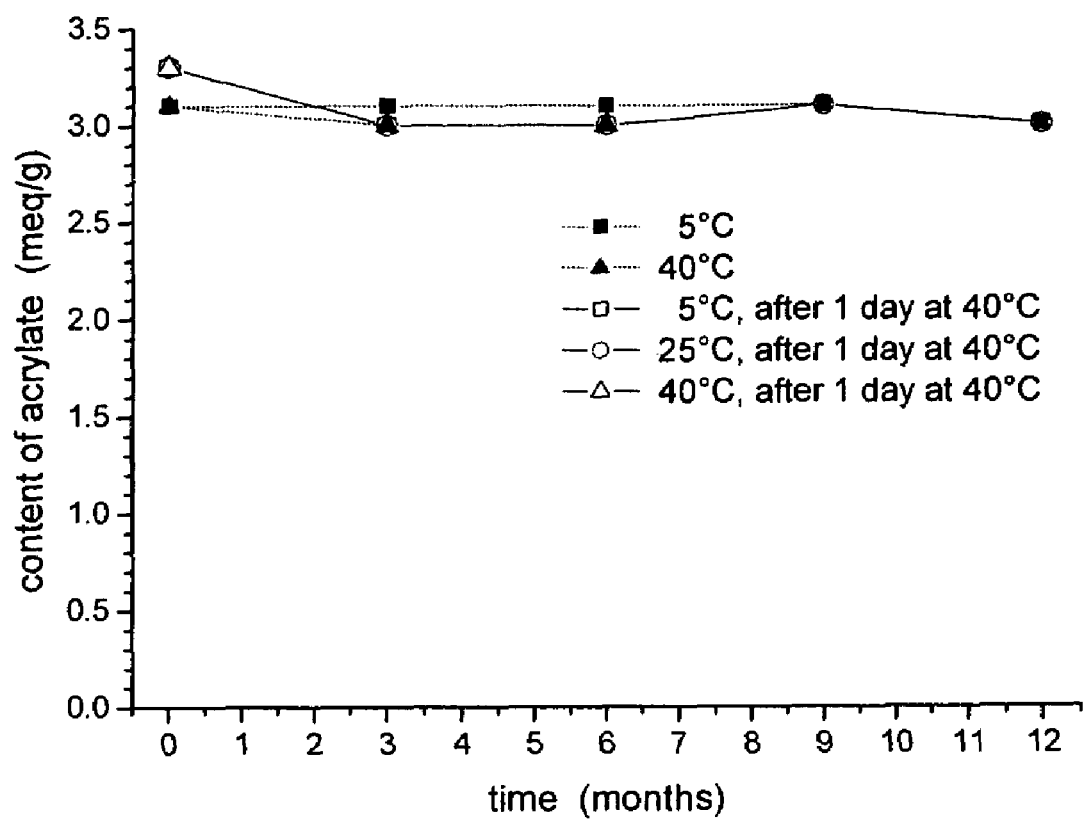
FIG. 5 is a graph showing the effect of storage temperature on stability and the content of acrylate groups for the 8-arm PEG-acrylate compounds.

After 6 months at 40° C., some of the 8-arm PEG-acrylate 2 k samples had partly or completely polymerized, indicating that a lower limit exists, under which the stabilizing effect of methylene blue is no longer obtained. FIG. 5 shows that the content of acrylate groups in the 8-arm PEG-acrylate 2 k samples that had not polymerized remained constant over the whole observation period, which is another proof that the methylene blue present in the samples protects the acrylate groups from reacting. As becomes clear from FIG. 4, the effect of methylene blue is enhanced by choosing appropriately low storage temperatures.

The invention claimed is:

1. A composition comprising a polymerizable compound with at least one conjugated unsaturated group and methylene blue to prevent premature polymerization of the polymerizable compound, wherein the composition contains methylene blue in a concentration of 10 to 5000 ppm, and wherein the polymerizable compound is a 4 to 8-arm poly (ethylene glycol) acrylate.

2. Composition according to claim 1, wherein the composition contains methylene blue in a concentration of 20 to 1000 ppm.

3. Composition according to claim 1, comprising less than 5% oxygen.

4. Composition according to claim 1, comprising less than 2% oxygen.

5. Composition according to claim 1, comprising less than 0.5% oxygen.

6. The composition of claim 1, wherein the composition is a medicinal composition.

7. The composition of claim 1, wherein the composition is a dental composition.

8. The composition of claim 1, wherein the composition is a pharmaceutical composition.

9. The composition of claim 1, wherein the polymerizable compound forms a biodegradable matrix.

10. The composition of claim 1, wherein the methylene blue is provided in an amount of 20 to 1000 ppm.

* * * * *